United States Patent
Krishnan et al.

(10) Patent No.: US 12,505,704 B2
(45) Date of Patent: Dec. 23, 2025

(54) DIRECT SENSOR LOGGING FOR VEHICLE NETWORK LOGGER SYSTEM

(71) Applicant: GM Cruise Holdings LLC, San Francisco, CA (US)

(72) Inventors: Narayanan Vinay Krishnan, San Francisco, CA (US); Aditya Immaneni, Foster City, CA (US); Yang Liu, Santa Clara, CA (US); Isabella Garza, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 201 days.

(21) Appl. No.: 18/365,679

(22) Filed: Aug. 4, 2023

(65) Prior Publication Data

US 2025/0046125 A1  Feb. 6, 2025

(51) Int. Cl.
*G07C 5/00* (2006.01)
*B60W 60/00* (2020.01)
*G07C 5/08* (2006.01)

(52) U.S. Cl.
CPC ........... *G07C 5/008* (2013.01); *B60W 60/001* (2020.02); *G07C 5/0841* (2013.01)

(58) Field of Classification Search
CPC ... G07C 5/008; G07C 5/0841; B60W 60/001; G06F 11/00
USPC ........................................................ 701/31.4
See application file for complete search history.

(56) References Cited

U.S. PATENT DOCUMENTS

| | | | |
|---|---|---|---|
| 10,759,444 B2* | 9/2020 | Michalakis | B60W 50/06 |
| 10,810,806 B2* | 10/2020 | Petousis | H04W 4/44 |
| 2017/0313332 A1* | 11/2017 | Paget | B61L 15/0072 |
| 2018/0261020 A1* | 9/2018 | Petousis | G07C 5/0841 |
| 2018/0322413 A1* | 11/2018 | Yocam | G06N 20/00 |
| 2019/0222652 A1* | 7/2019 | Graefe | H04L 67/12 |
| 2019/0376809 A1* | 12/2019 | Hanniel | G05D 1/028 |
| 2020/0017117 A1* | 1/2020 | Milton | G08G 1/0112 |
| 2020/0334762 A1* | 10/2020 | Carver | G07C 5/0825 |
| 2020/0410783 A1* | 12/2020 | Duarte Gelvez | G07C 5/0841 |
| 2021/0312729 A1* | 10/2021 | Smith | G07C 5/0841 |
| 2021/0341303 A1* | 11/2021 | Rappel-Kroyzer | G08G 1/0141 |
| 2022/0187847 A1* | 6/2022 | Cella | G06Q 10/06 |
| 2025/0046125 A1* | 2/2025 | Krishnan | G07C 5/0841 |
| 2025/0065900 A1* | 2/2025 | Gideon | G01C 21/3602 |

* cited by examiner

*Primary Examiner* — Tyler D Paige
(74) *Attorney, Agent, or Firm* — CANTOR COLBURN LLP

(57) ABSTRACT

A method for performing direct logging of sensor data in a vehicle network logging system (VNLS) installed on an autonomous vehicle (AV), the VNLS comprising a network switch connected between an onboard sensor of the AV and an onboard computer of the AV, the network switch comprising a logger for logging sensor data to a disk, is described and includes providing a converter node on the network switch; receiving, using the converter node, data generated by the onboard sensor; and converting, using the converter node, the received data to a data record suitable for logging by the logger to the disk.

20 Claims, 8 Drawing Sheets

DIRECT SENSOR LOGGING FOR VEHICLE NETWORK LOGGER SYSTEM

BACKGROUND

Technical Field

The present disclosure relates generally to autonomous vehicles (AVs) and, more specifically, to techniques for direct logging of sensor data in a vehicle network logger system (VNLS) in connection with such AVs.

INTRODUCTION

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
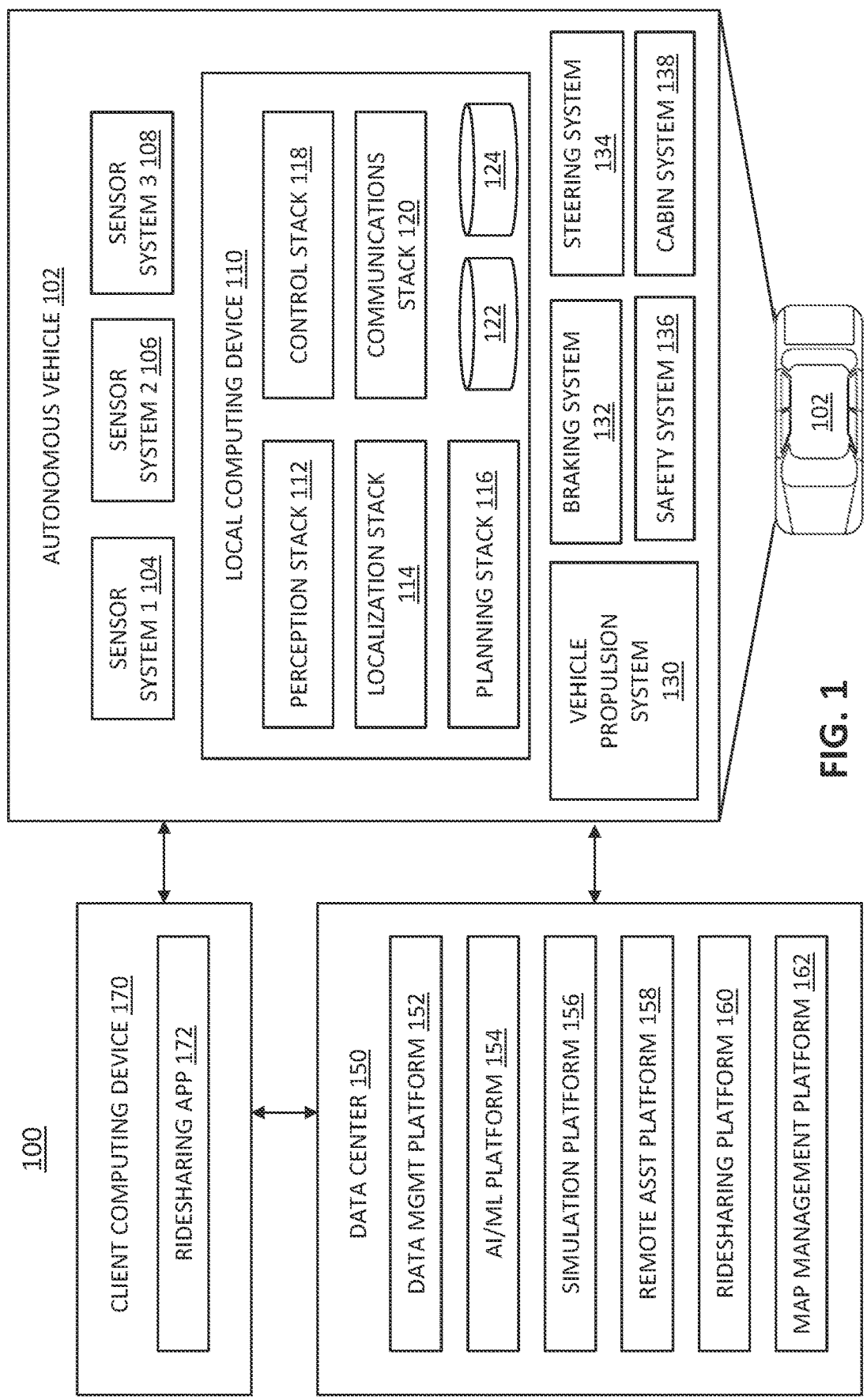
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

Throughout operation of an AV, various information in connection with the AV is logged by a vehicle network logger system (VNLS). In the context of AVs and as used herein, the term logger refers to an application that stores to persistent media relevant information about various hardware/software devices on AVs (often comprising a fleet of AVs) during operation of the AVs. This data is later uploaded to the cloud or otherwise offloaded for parsing in order to understand what might have happened during a drive and/or recreate a drive in its entirety on equivalent hardware, for example. The saved data may include (1) all input information fed to an AV stack of an AV (for example, all sensor data), (2) the output of any non-deterministic calculations and (3) states of different software modules. The information may be used for a variety of purposes, including debugging of software modules, legal compliance, and performance improvements (especially with regard to the AV stack).

In particular embodiments, AV loggers located on a network switch log certain data for a drive and store the data to disks. The data may be subsequently offloaded from the disks, e.g., when the AVs return to the garage. As vehicle network logger (VNL) architecture changes, the size of the data logged on AVs will need to be reduced substantially and other methods of manual disk offloading will become less desirable. Moreover, as an AV fleet expands, the amount of data logged needs to be reduced to save on onboard hardware costs, offload times, and offload storage costs. Still further, as sensor traffic between AV automated driving systems computers (ADSCs) and the network switch on which the logger resides increases, logging needs to be scaled accordingly.

During robot operating system (ROS) messaging and data logging on certain AVs, sensor data can be logged at the frame level. A frame refers to a full unit of output from a sensor (e.g., a JPEG image for a camera or a 360 degree point scan for a LIDAR). The frame is the output of the ROS driver node for each sensor except cameras, camera data from which is processed by a device such as a direct memory access (DMA) network interface card (NIC) field programmable gate array (FPGA). Logging of sensor data in some cases can be accomplished by sending output messages from the driver node of each sensor to the VNLS to be logged as a CB record, the format of which is described hereinbelow. The foregoing approach presented at least two problems. First, sensor data travels twice on the network path between network switch and the ADSC, requiring the ADSC to expend CPU cycles and allocate RAM usage to log the sensor data, resulting in increased sensor traffic bandwidth. Second, sensor data that is logged is a composite of the raw data seen by the ADSC (e.g., a 360 degree scan instead of a raw network packet), resulting in a less accurate replay environment. Network data packets may be regenerated from a full frame, adding in simulated time stamps to attempt to recreate the network traffic on the AV. This has the disadvantage of not knowing what the actual traffic flow patterns are and not recreating possible network congestion scenarios.

In accordance with features of embodiments described herein, a logger of a VNLS is stored on a network switch of the AV, allowing it to listen to incoming network traffic from all sensors and directly log them to disk. This process is referred to herein as direct sensor logging. Direct sensor logging in turn allows the logging activity not to add any processing or other resource burden on the primary compute. A unique data format, referred to herein as C-RAW, ensconces incoming user datagram protocol (UDP) packets from sensors with a fixed header that uses the UDP source address to identify the sensor type, and thereby the message data format, of the data being transmitted. The C-RAW format is also backward compatible with the CB format, which is convertible to the ROS messaging format. Direct sensor logging has an additional benefit of reducing the CPU load on the logger, as it is not required to parse frames, and create serialized ROS messages for logging.

However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit in route to a pick-up or drop-off location, and so on.

Example System for Logging Sensor Data in a VNLS

Figure 2:
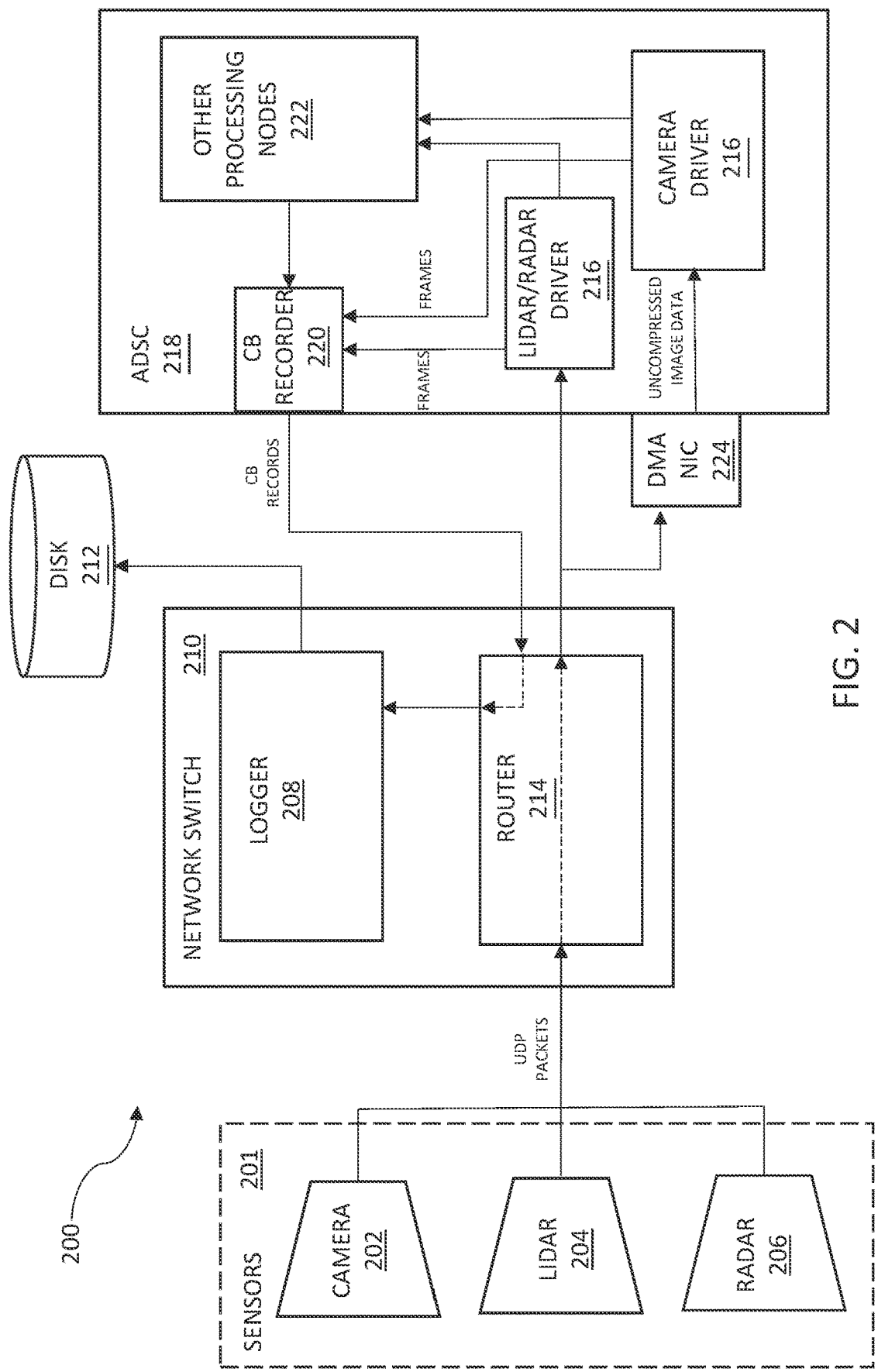
FIG. 2 illustrates a simplified block diagram of a vehicle network logger system (VNLS), according to some aspects of the disclosed technology.

FIG. 2 illustrates a simplified diagram of a VNLS 200 in which data from sensors 201, which may include cameras 202, LIDAR sensors 204, and RADAR sensors 206, is logged by a logger 208 executing on a network switch 210 to disk 212. As shown in FIG. 2, multicast UDP packets comprising data generated by sensors 201 are routed through a router 214 on network switch 210 to ADSC 216. Corresponding nodes or processes, such as ROS drivers 218, executing on ADSC 216 listen for network traffic relevant to the sensor with which the driver is associated and process the packets to recreate data frames (e.g., camera images, LIDAR point clouds, etc.), which are sent to a CB recorder 220. Raw sensor data (e.g., UDP packets) may also be made available to other processing nodes 222 for further processing and use in operating the AV. CB recorder 220 packages the streams as CB records (described below) and returns them to the network switch 210 where they are routed by router 214 to logger 208. Logger 208 logs the CB records from CB recorder 220 to CB files on disk 212.

As described above, the sensor data logging illustrated in FIG. 2 is executed at the frame, rather than the packet, level, with frames being the output of the ROS driver node for each sensor except for cameras. Camera data is processed by a device such as a direct memory access (DMA) network interface card (NIC) field programmable gate array (FPGA) 224.

It will be noted that, in the process of logging sensor data illustrated in FIG. 2, sensor data traffic traverses network switch 210 twice: once from sensor 201 to ADSC 218, where it is processed, and again from ADSC 218 to switch, where it is logged. Additionally, processing of sensor data performed by drivers 216 consumes CPU cycles of ADSC 216.

Example System for Direct Logging of Sensor Data in a VNLS

Figure 3:
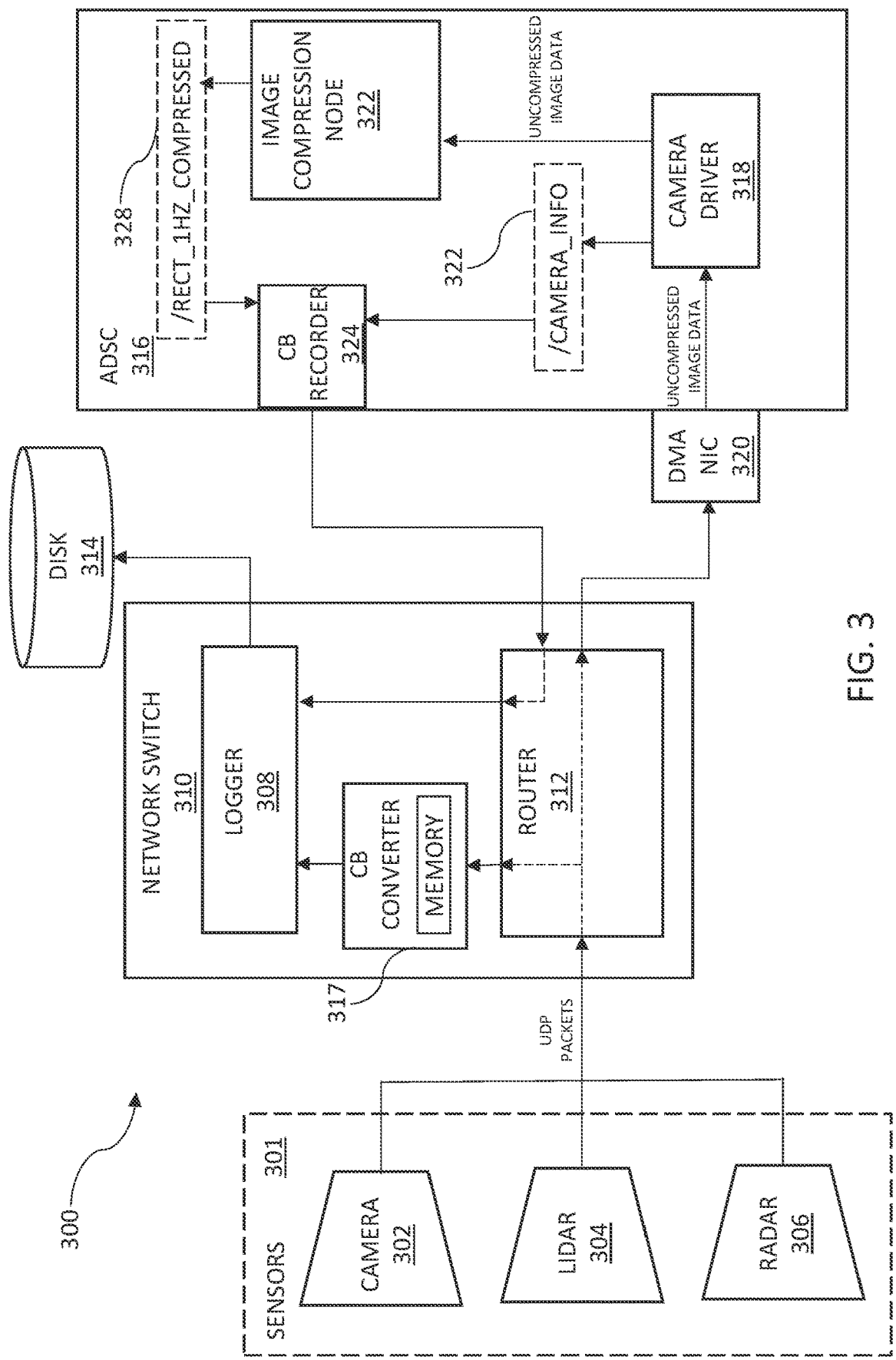
FIG. 3 illustrates a simplified block diagram of a 'VNLS' in which direct sensor logging is performed, according to some aspects of the disclosed technology.

FIG. 3 illustrates a simplified diagram of a VNLS 300 in which data from sensors 301, which may include cameras 302, LIDAR sensors 304, and RADAR sensors 306, is directly logged by a logger 308 executing on a network switch 310 to disk 312 in accordance with features of embodiments described herein. As shown in FIG. 3, multicast UDP packets comprising data generated by sensors 301 are routed through a router 314 on network switch 310 to ADSC 316. In contrast to VNLS 200 (FIG. 2), VNLS 300 includes a CB converter 317. CB converter 317 listens to network traffic traversing router 314 and captures UDP packets from sensors 301 for processing on the switch 310. In particular, as described in greater detail below, CB converter 317 converts UDP packets into C-RAW records, which are CB-compatible records and which logger 308 logs to CB files on disk 312.

As shown in FIG. 3, ADSC 316 may include an ROS driver 318 for processing uncompressed image data from DMA NIC 320 into a ROS message 322 for processing by a CB recorder 324 on ADSC. Similarly, an image compression node 326 may be provided for processing uncompressed image data into a second ROS message 328 for processing by CB recorder 324. CB recorder 324 packages the streams as CB records and forwards them to the network switch 310 where they are routed by router 314 to logger 308. Logger 308 logs the CB records from CB recorder 320 to CB files on disk 312.

As described above, the direct sensor logging illustrated in FIG. 3 is executed at the packet, rather than the frame, level. Additionally, using direct sensor logging techniques, sensor data traffic for logging traverses network switch 310 only once because it is processed directly on the switch by CB converter 317 and logged directly therefrom (as CB-compatible C-RAW records). This process also avoids the consumption of ADSC CPU cycles formerly required to process sensor data for logging when that process was performed by ROS nodes executing on ADSC.

Example Data File Formats for Use in Direct Sensor Logging for VLNS

As previously noted, in direct sensor logging techniques described herein, UDP packets comprising sensor data are directly logged onto disk (e.g., disk 312 (FIG. 3)) by a logger (e.g., logger 308 (FIG. 3)) as CB-compatible C-RAW records. The ability to offload the data from the disk, as well as the entire data ingest pipeline subsequent to offload, may rely on the sensor data being stored on the disk in CB-compatible file format. As a result, certain embodiments depend on the raw network packets being logged in a format that is compatible with the CB file format, or have a post-processing script that can convert raw packets into a CB file format for enabling data ingest.

In particular embodiments, the C-RAW format described hereinbelow is employed to facilitate capture and logging of UDP sensor data packets with minimal overhead while maintaining compatibility with the CB file format. The C-RAW format accomplishes at least two fundamental goals, including capturing relevant packet level information without the overhead of general packet capture (pcap) format and maintaining compatibility with the CB file format for ease of subsequent data ingestion. In particular, a primary purpose of direct sensor logging techniques described herein is to capture network packet data with sufficient detail to enable network traffic scenario reconstruction. The standard packet capture format that accomplishes this is pcap-ng format. For each network packet, in addition to the payload data from a sensor, the format also captures the following information:

[Ethernet Header][IP Header][UDP Header]

The information from all of these headers is required to reconstruct the packet; however, in certain AVs, the network configuration is statically determined. Accordingly, by knowing the identity of the edge device (e.g., the sensor) that originated the packet as well as the vehicle type, the following information may be deterministically derived:

Source+Destination IP Address: Port/MAC Address
VLAN Information

In other words, all of the information required for the three network headers noted above may be recreated simply by knowing the type of the device the data originated from. The C-RAW replaces the three headers (Ethernet, IP, and UDP) with a two-byte identifier, referred to as a connection_id, which identifies the originating device and therefore encapsulates all of the above information and stores payload data along with the identifier.

Figure 4:
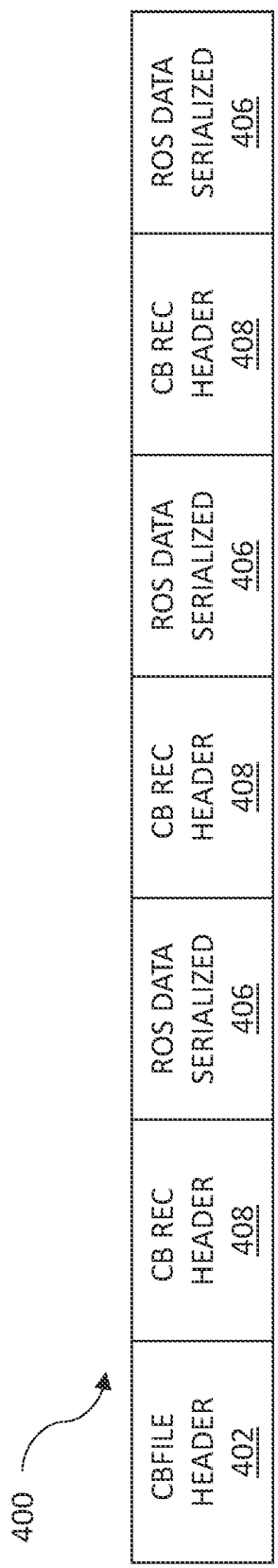
FIG. 4 illustrates an example format of a CB file, according to some aspects of the disclosed technology.

As noted above, another goal of the C-RAW format is to maintain compatibility with the CB file format. FIG. 4 illustrates an example CB file 400. As shown in FIG. 4, the CB file 400 includes a CBfile Header 402 followed by a series of serialized ROS data fields 406 preceded by respective CB Record Headers 408. Each serialized ROS data fields 406 comprises an ROS header 410 and payload data 412. In system 200, payload data 412 comprises a data frame.

Figure 5A:
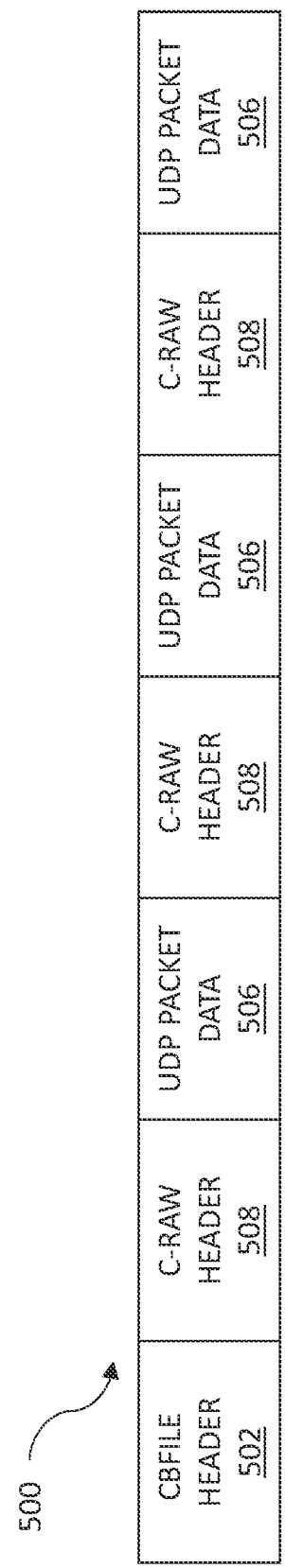
FIGS. 5A and 5B illustrate example formats of a C-RAW file, according to some aspects of the disclosed technology.

To maintain compatibility with a CB file, a C-RAW format file will need to appear similar. To accomplish this, a raw UDP packet may be encapsulated in an ROS message. The minimum standard ROS message type that can accept arbitrary length binary data is UInt8MultiArray. FIG. 5A illustrates an example C-RAW file 500, which includes a CBfile header 502 followed by a series of UDP Packet Data fields 506 preceded by respective C-RAW headers 508.

Figure 5B:
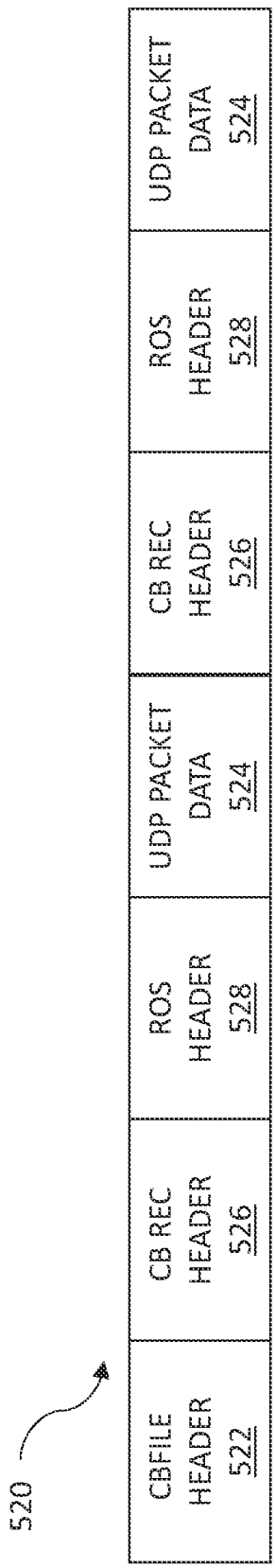

In particular embodiments, each C-RAW header 508 will resemble a CB Record Header+Ult8MultiArray type ROS message header, such that a resulting C-RAW file may be represented as shown in FIG. 5B and designed by a reference numeral 520. In particular, as shown in FIG. 5B, a C-RAW file 520 includes a CBfile Header 522 and a series of UDP Packet Data fields 524 preceded by respective CB record headers 526 and ROS headers 528.

In particular embodiments, the format of the CB record header is as shown below in Table 1:

TABLE 1

| Field Name | Field Length | Comments |
| --- | --- | --- |
| Record Type | 1 Byte | Set to\x01 (Message CB Record Type) |
| Connection ID | 4 Bytes | 16-bit number that represents the packet source (i.e., the device that generated the packet) |
| Seconds | 4 Bytes | Together with Nanoseconds, the packet receipt by logger timestamp in local time of the vehicle |
| Nanoseconds | 4 Bytes | Together with Seconds, the packet receipt by logger timestamp in local time of the vehicle |

In particular embodiments, the ROS header will be the header for a ROS message of type UInt8MultiArray, the first two four-byte fields of which contain and the final four byte field of which contains the length of the UDP packet. In particular embodiments, the final four byte field (or the packet length (Pkt Length) field) may be constrained to be less than or equal to the CB record length minus 22.

In view of the foregoing, a C-RAW file soured from a device that has a connection ID of ab, where and a and b are a byte, is:

[CBfile Header] [CB Record] [CB Record] [CB Record] [CB Record]

where:

[CBfile Header]==CBfile\x01
[CB Record]==[Header] [UDP Packet Data]
[Header]==\x01 [Record Length] [Connection ID] [Seconds] [Nanoseconds] 00000000 [Pkt Length]

Example Techniques for Performing Direct Data Logging

Figure 6A:
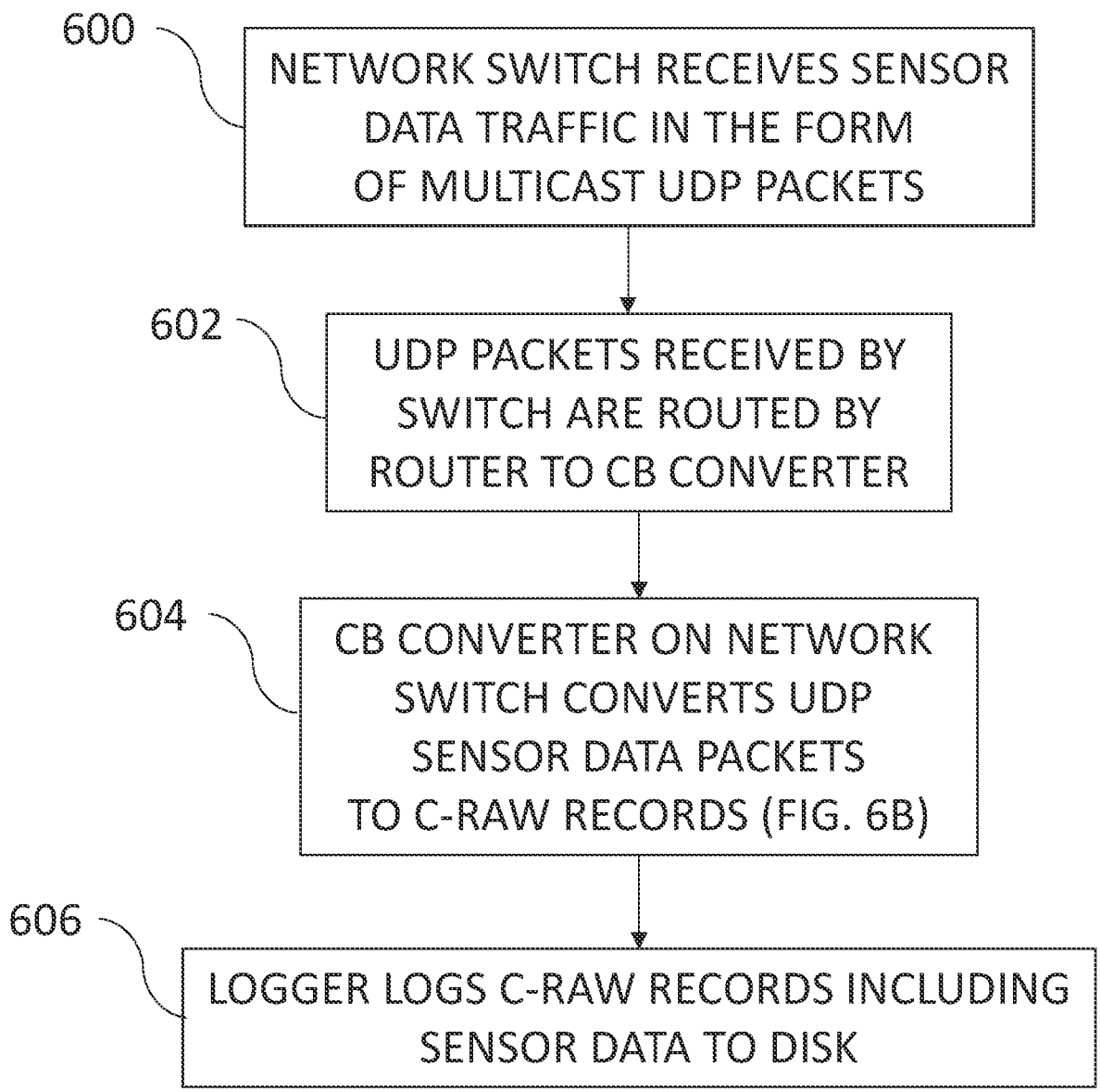
FIG. 6A and FIG. 6B illustrate a flow diagram of example operations for performing direct sensor logging in connection with a VNLS, according to some aspects of the disclosed technology.
Figure 6B:
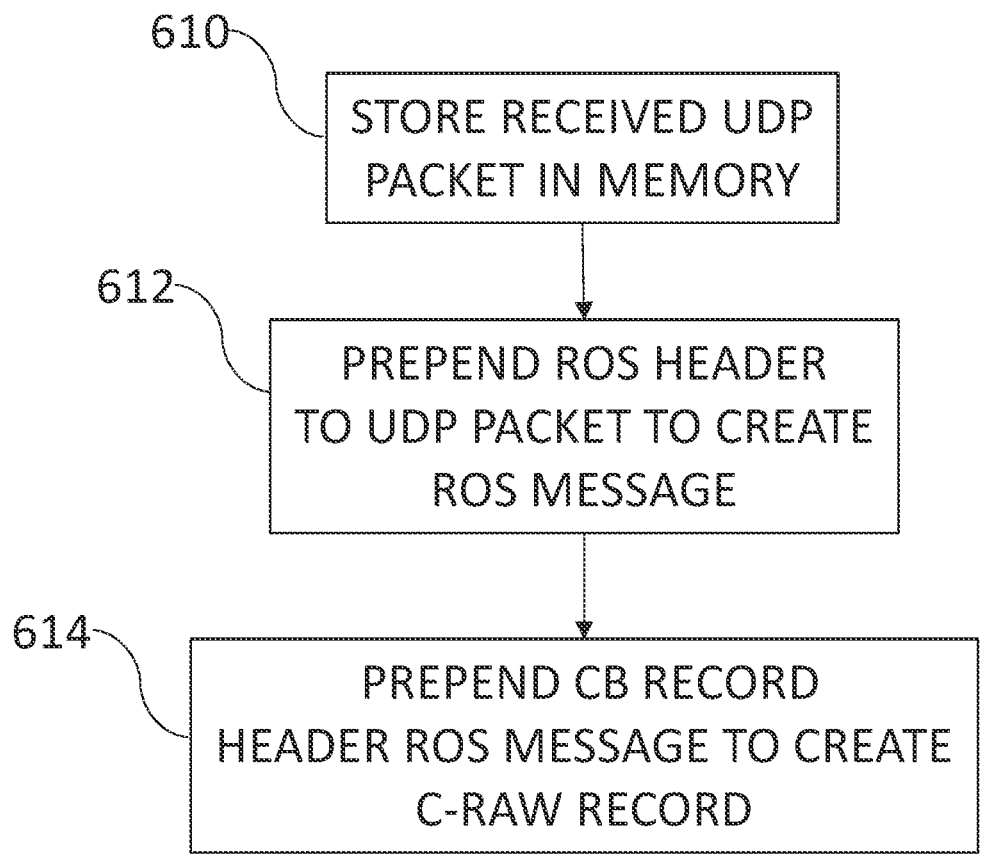

FIGS. 6A and 6B are flowcharts illustrating example operations in connection with direct data logging in a VNLS in accordance with embodiments described herein. In certain embodiments, one or more of the operations illustrated in FIGS. 6A and 6B may be executed by one or more of the elements shown in FIGS. 1 and/or 3, for example.

Referring first to FIG. 6A, in 600, network switch (e.g., network switch 310 (FIG. 3)) receives sensor data traffic in the form of multicast UDP packets from a sensor (e.g., one of sensors 301 (FIG. 3)).

In 602, the UDP packets comprising the sensor data traffic are routed (e.g., by router 314 (FIG. 3)) to a CB converter on the switch (e.g., CB converter 317 (FIG. 3)).

In 604, CB converter converts UDP sensor data packets to C-RAW records, as will be described in greater detail below with reference to FIG. 6B.

In 606, the logger (e.g., logger 308 (FIG. 3)) logs the C-RAW record comprising the sensor data to disk (e.g., disk 312 (FIG. 3)) with other C-RAW records as a CB-compatible file.

As noted above, FIG. 6B is a flowchart illustrating operations example operations in connection with converting UDP sensor data packets to CB-compatible C-RAW records in accordance with particular embodiments.

In 610, the UDP packet received by CB converter on the network switch is stored in memory.

In 612, a ROS header is prepended to the UDP packet to create a ROS message. Composition of ROS header is described in detail above with reference to FIGS. 4, 5A and 5B.

In 614, a CB record header is prepended to the ROS message created in 612 to create a C-RAW record. Composition of CB record header is described in detail above with reference to FIGS. 4, 5A and 5B.

Although the operations of the example method shown in and described with reference to FIGS. 6A and 6B are illustrated as occurring once each and in a particular order, it will be recognized that the operations may be performed in any suitable order and repeated as desired. Additionally, one or more operations may be performed in parallel. Furthermore, the operations illustrated in FIGS. 6A and 6B may be combined or may include more or fewer details than described.

Example Processor-Based System

Figure 7:
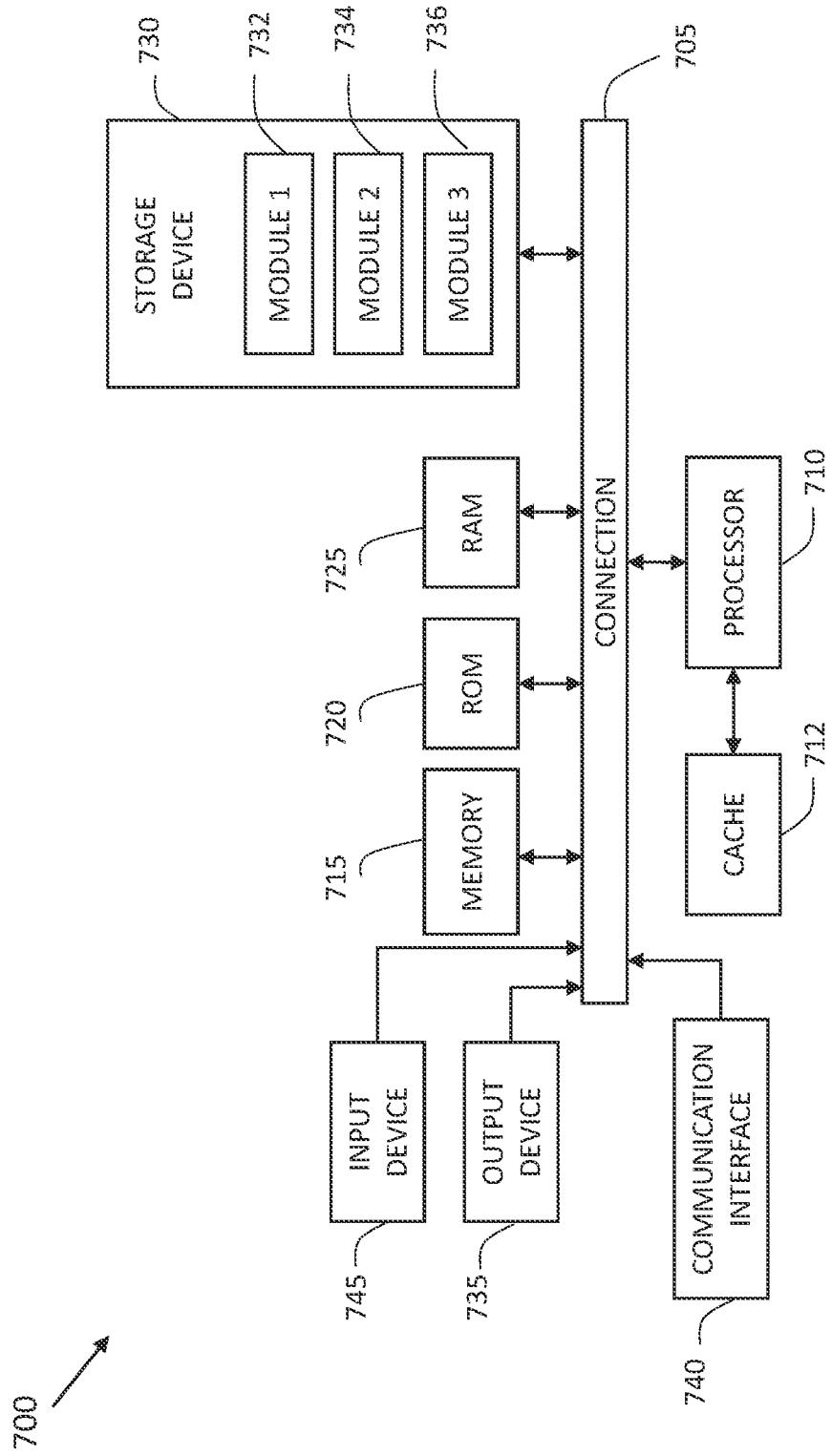
FIG. 7 illustrates an example processor-based system with which some aspects of the disclosed technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special purpose processor where software instructions are incorporated into the actual processor design. One or more of services 732, 734, and 736 may be involved in implementing one or more operations shown and described in FIG. 6. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a method for performing direct logging of sensor data in a vehicle network logging system (VNLS) installed on an autonomous vehicle (AV), the VNLS including a network switch connected between an onboard sensor of the AV and an onboard computer of the AV, the network switch including a logger for logging sensor data to a disk, the method including providing a converter node on the network switch; receiving, using the converter node, data generated by the onboard sensor; and converting, using the converter node, the received data to a data record suitable for logging by the logger to the disk.

Example 2 provides the method of example 1, wherein the converting includes encapsulating the sensor data as a Robot Operating System (ROS) message.

Example 3 provides the method of example 1, wherein the sensor data includes a user datagram protocol (UDP) packet.

Example 4 provides the method of example 1, wherein the converting includes prepending a Robot Operating System (ROS) header to the sensor data.

Example 5 provides the method of example 4, wherein the ROS header is associated with a ROS message type UInt8Multiarray.

Example 6 provides the method of example 4, wherein the converting further includes prepending a record header to the sensor data including the ROS header.

Example 7 provides the method of example 6, wherein the record header includes a record type indicator.

Example 8 provides the method of example 6, wherein the record header includes a connection ID, wherein the connection ID identifies the onboard sensor.

Example 9 provides the method of example 6, wherein the record header indicates a length of the data record.

Example 10 provides the method of example 6, wherein the record header includes a time stamp indicating a time of receipt of the data by the logger.

Example 11 provides a vehicle network logging system (VNLS) installed on an autonomous vehicle (AV), the VNLS including a disk for storing data; and a network switch connected between a plurality of onboard sensors of the AV and an onboard computer of the AV, the network switch including a logger for logging data generated by the onboard sensors to the disk; and a converter node on the network switch, the converter node receiving the data generated by the onboard sensors and converting the received data to data records suitable for logging by the logger to the disk.

Example 12 provides the VNLS of example 11, wherein the sensor data includes user datagram protocol (UDP) packets and the converting includes encapsulating the sensor data as Robot Operating System (ROS) messages.

Example 13 provides the VNLS of example 11, wherein the converting includes prepending Robot Operating System (ROS) headers to the sensor data.

Example 14 provides the VNLS of example 13, wherein the converting further includes prepending record headers to the sensor data including the ROS headers.

Example 15 provides the VNLS of example 14, wherein each of the record headers includes a record type indicator, a connection ID identifying the one of the onboard sensors from which the data originated, a length of the data record, and a time stamp indicating a time of receipt of the data by the logger.

Example 16 provides one or more non-transitory computer-readable storage media including instruction for execution which, when executed by a processor, are operable to perform direct logging of sensor data in a vehicle network logging system (VNLS) installed on an autonomous vehicle (AV), the VNLS including a network switch connected between an onboard sensor of the AV and an onboard computer of the AV, the network switch including a logger for logging sensor data to a disk, the operations including providing a converter node on the network switch; receiving, using the converter node, data generated by the onboard sensor; and converting, using the converter node, the received data to a data record suitable for logging by the logger to the disk.

Example 17 provides the one or more non-transitory computer-readable storage media of example 16, wherein the sensor data includes a user datagram protocol (UDP) packet and the converting includes encapsulating the sensor data as a Robot Operating System (ROS) message.

Example 18 provides the one or more non-transitory computer-readable storage media of example 16, wherein the converting includes prepending a Robot Operating System (ROS) header to the UDP packet.

Example 19 provides the one or more non-transitory computer-readable storage media of example 16, wherein the converting further includes prepending a record header to the UDP packet and the ROS header.

Example 20 provides the one or more non-transitory computer-readable storage media of example 19, wherein the record header includes a record type indicator, a connection ID identifying the onboard sensor, a length of the data record, and a time stamp indicating a time of receipt of the data by the logger.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A computer-implemented method for performing direct logging of sensor data in a vehicle network logging system (VNLS) installed on an autonomous vehicle (AV), the method comprising:

initializing a converter node on a network switch of the VNLS, wherein the network switch is connected between an onboard sensor of the AV and an onboard computer of the AV, the network switch comprising a logger for logging sensor data to a disk;

receiving, using the converter node, data generated by the onboard sensor; and converting, using the converter node, the received data to a data record suitable for logging by the logger to the disk.

2. The computer-implemented method of claim 1, wherein the converting comprises encapsulating the sensor data as a Robot Operating System (ROS) message.

3. The computer-implemented method of claim 1, wherein the sensor data comprises a user datagram protocol (UDP) packet.

4. The computer-implemented method of claim 1, wherein the converting comprises prepending a Robot Operating System (ROS) header to the sensor data.

5. The computer-implemented method of claim 4, wherein the ROS header is associated with a ROS message type UInt8Multiarray.

6. The computer-implemented method of claim 4, wherein the converting further comprises prepending a record header to the sensor data including the ROS header.

7. The computer-implemented method of claim 6, wherein the record header comprises a record type indicator.

8. The computer-implemented method of claim 6, wherein the record header includes a connection ID, wherein the connection ID identifies the onboard sensor.

9. The computer-implemented method of claim 6, wherein the record header indicates a length of the data record.

10. The computer-implemented method of claim 6, wherein the record header includes a time stamp indicating a time of receipt of the data by the logger.

11. A vehicle network logging system (VNLS) installed on an autonomous vehicle (AV), the VNLS comprising:
a disk for storing data; and
a network switch connected between a plurality of onboard sensors of the AV and an onboard computer of the AV, the network switch comprising:
a logger for logging data generated by the onboard sensors to the disk; and
a converter node on the network switch, the converter node receiving the data generated by the onboard sensors and converting the received data to data records suitable for logging by the logger to the disk.

12. The VNLS of claim 11, wherein the sensor data comprises user datagram protocol (UDP) packets and the converting comprises encapsulating the sensor data as Robot Operating System (ROS) messages.

13. The VNLS of claim 11, wherein the converting comprises prepending Robot Operating System (ROS) headers to the sensor data.

14. The VNLS of claim 13, wherein the converting further comprises prepending record headers to the sensor data including the ROS headers.

15. The VNLS of claim 14, wherein each of the record headers includes a record type indicator, a connection ID identifying the one of the onboard sensors from which the data originated, a length of the data record, and a time stamp indicating a time of receipt of the data by the logger.

16. One or more non-transitory computer-readable storage media comprising instruction for execution which, when executed by a processor, are operable to perform direct logging of sensor data in a vehicle network logging system (VNLS) installed on an autonomous vehicle (AV), the VNLS comprising a network switch connected between an onboard sensor of the AV and an onboard computer of the AV, the network switch comprising a logger for logging sensor data to a disk, the operations comprising:
providing a converter node on the network switch;
receiving, using the converter node, data generated by the onboard sensor; and
converting, using the converter node, the received data to a data record suitable for logging by the logger to the disk.

17. The one or more non-transitory computer-readable storage media of claim 16, wherein the sensor data comprises a user datagram protocol (UDP) packet and the converting comprises encapsulating the sensor data as a Robot Operating System (ROS) message.

18. The one or more non-transitory computer-readable storage media of claim 16, wherein the converting comprises prepending a Robot Operating System (ROS) header to the UDP packet.

19. The one or more non-transitory computer-readable storage media of claim 16, wherein the converting further comprises prepending a record header to the UDP packet and the ROS header.

20. The one or more non-transitory computer-readable storage media of claim 19, wherein the record header includes a record type indicator, a connection ID identifying the onboard sensor, a length of the data record, and a time stamp indicating a time of receipt of the data by the logger.

* * * * *